March 26, 1940.  P. SCHLUMBOHM  2,195,389
MOBILE REFRIGERATING SYSTEM
Filed Nov. 3, 1939
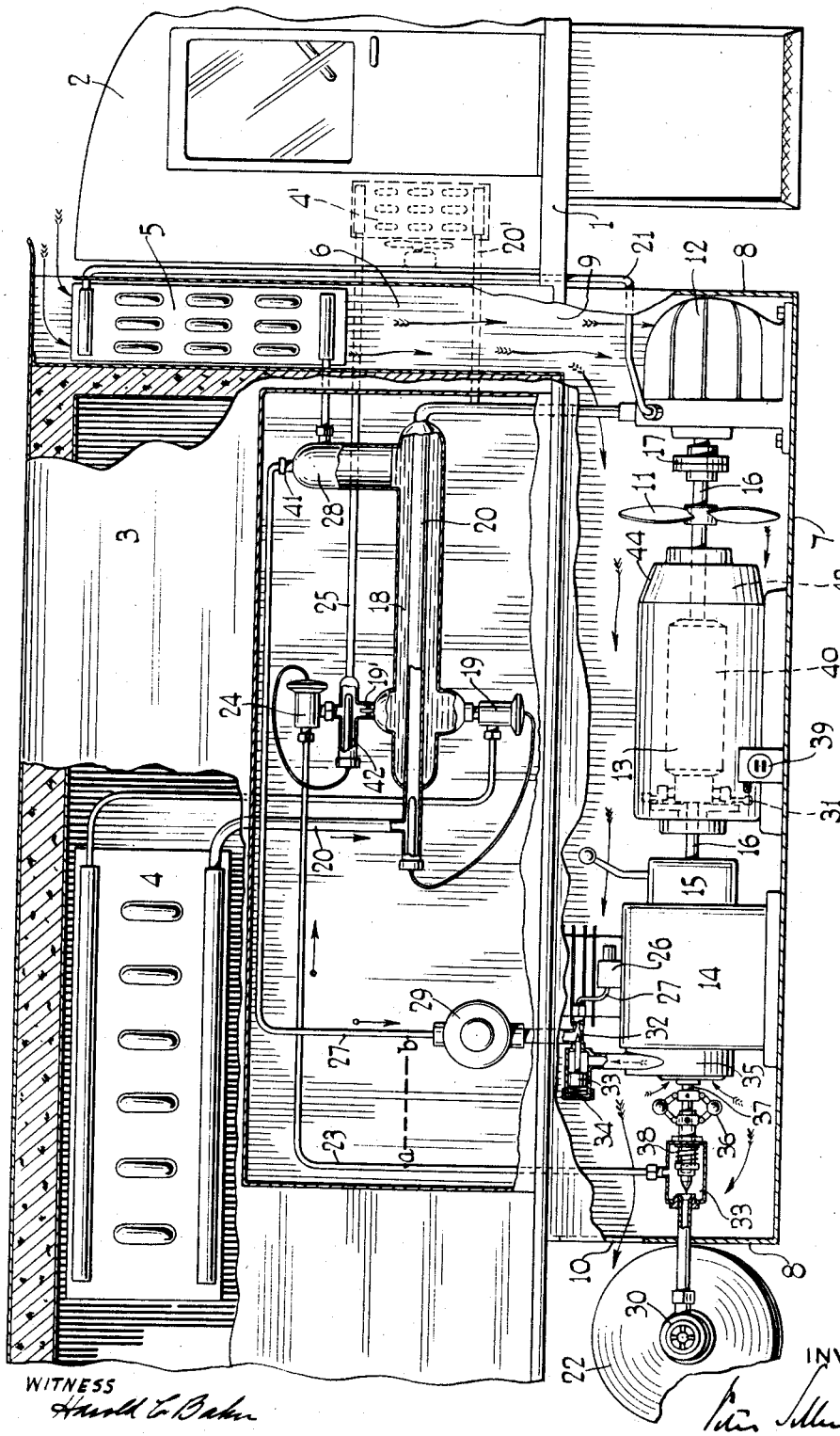
WITNESS
INVENTOR Patented Mar. 26, 1940

2,195,389

UNITED STATES PATENT OFFICE 2,195,389

MOBILE REFRIGERATING SYSTEM

Peter Schlumbohm, New York, N. Y., assignor to Propane Development Corporation, New York, N. Y., a company of Delaware Application November 3, 1939, Serial No. 302,719

4 Claims. (Cl. 62—117)

The invention refers to a compression refrigerating system in which the compressor is driven alternatingly by a combustion engine or by an electrical motor. Such installations are known as emergency installations, where a combustion engine is held in reserve should the electric current break down. Furthermore, such installations have been worked out for refrigerated trucks so that a gasoline engine could be used on the road, while the electric motor would be used for driving the compressor during the night, while the truck is in the garage. In both cases the two driving means were designed to operate separately. Clutches were used to connect the compressor to the one kind of driving means while disconnecting the compressor from the other type of driving means. In both cases special means had to be provided for starting the combustion engine. The combustion engine had to be started either by a hand cranking device or by some automotive starting equipment, as used in automobiles, based on the usual battery.

During the two years of experimental development work which finally has led to the present invention those conventional means were tried out to solve the specific difficulties involved in refrigerating trucks for transportation of perishable foods. In this application of refrigeration weight and space are of vital importance. The general trend in this technique since its beginning only some years ago can be summed up as follows:

a. To save weight the motor of the vehicle was used as a source of power for driving the refrigeration compressor. The inconstancy of the refrigerating work proved unsatisfactory.

b. To insure constancy very heavy containers filled with frozen brine were installed and the brine was frozen during the night time by driving the compressor from an electrical motor. In a standard truck the weight of four of such brine tanks would total easily a thousand pounds, not including the weight for the machinery of the condensing unit, and would absorb much space.

c. At present there is a trend to go back to the light weight of the direct expansion system. This necessitates practically a continuous working of the compressor, day and night, and the mechanical problem of driving the compressor is again in the foreground.

For the day work on the road a propane motor proved to be a very reliable driving means. However, objections were made against running any kind of combustion engine at night during the garage period, as labor problems would make a supervision too costly. It was found that a truck installation which aside of the combustion motor and its automotive starting means, with its battery, starter and generator, and aside of the compressor would in addition comprise a powerful electrical motor, together with two clutches and two sets of belt drives, one for each kind of driving means, would be too costly, too heavy, and would require too much space.

The present invention solves the problem by utilizing the 110 volt or 220 volt electrical motor, which drives the compressor during the garage period, also for starting the combustion engine. This eliminates the heavy and costly and roomy low voltage automotive starting equipment with its battery and starter-generator.

The invention is illustrated in the accompanying drawing.

The example chosen for the drawing shows furthermore a combination of the present invention with my invention of a transitory compression cycle which itself has been described in my copending patent application, Serial No. 264,506. However, the application of the present invention to a standard closed refrigeration compression cycle can be interpreted without any doubt from the drawing.

In the drawing a truck 1 is indicated by the driver's cab 2 and the truck body 3. Inside of the truck body the evaporator 4 of a refrigeration circuit is placed. The condenser 5 of the refrigerating system is arranged in a chimney-like space 6 between the front wall of the body 3 and the back wall of the cab 2. The power base 7 of the refrigerating system is placed underneath the truck body 3 and is boxed in by side walls 8. The box is connected with an air inlet opening 9 to the chimney 6 and is provided with an air outlet opening 10 so that, as indicated by the feathered arrows air may enter above the cab 2 through the condenser 5 into the chimney 6 and pass through the box under the propelling influence of blower 11 and under the influence of the frontal wind pressure. The power base 7 carries the compressor 12, the electrical motor 13 and the combustion engine 14. In the example given in the drawing these three elements are coupled directly without any belt. A clutch 15 serves to engage to or to disengage from the main driving shaft 16 the engine 14. The blower 11 may be formed by a propeller mounted on the main driving shaft 16; a flexible coupling 17 may be provided between the driving shaft 16 and the shaft of the compressor 12.

The liquid refrigerant flows from the receiver tank 18 through the main expansion valve 19 into the evaporator 4. The vapor of the refrigerant passes from the evaporator 4 through suction line 20 into the compressor 12 which compresses the vapor through pressure line 21 into the condenser 5. Liquified refrigerant flows from the condenser 5 back into the receiver tank 18 and expands anew through the main expansion valve 19. So far this circuit may represent a standard compression refrigeration cycle of the closed type. This is true also for the new invention, as illustrated in the drawing, of providing a subsidiary evaporator 4' to cool the driver's cab 2 for air-conditioning purposes. This subsidiary evaporator is fed with liquid refrigerant from the receiver tank 18 through the capillary 19' and is connected to the main suction line 20 by pipe 20'. The additional equipment of the receiver tank, as illustrated in the drawing, refers to my previous invention of the transitory refrigerating compression cycle, in which a fuel gas, like propane, passes on its way from a propane storage tank 22 to a propane combustion motor 14 through a refrigeration cycle, in which it is utilized as refrigerant prior to its combustion as engine fuel. In this case, propane passes from the storage tank 22 through a fill-up line 23 and through the thermal-valve 24 into the low-side of the compression circuit, making its way through pipe 25, evaporator 4' and pipe 20' into the suction line 20.

The carburetor 26 of the propane engine 14 receives gaseous propane fuel through fuel-line 27 from the gas space 28 of the receiver tank 28. The propane pressure of space 28 is reduced to about six ounces by the reduction valve 29.

The operation is started by plugging in the electrical motor 13 and engaging the engine 14 by means of clutch 15, while opening the hand valve 30 of the propane storage tank 22.

Following the invention, the operating speed of the engine 14 is chosen higher than the R. P. M. of the electrical motor 13, which usually is 1750 R. P. M. For instance, the R. P. M. of engine 14 is chosen to be 2000 R. P. M. This makes it possible to cut out the electric current for motor 13 automatically after the propane engine 14 starts working and increases the R. P. M. of shaft 16 from 1750 to 2000. The increased R. P. M. can be utilized to operate contact-levers 31 centrifugally. Such centrifugally operated contact levers, e. g. brush levers, are well known in the art and I may be spared a detailed description.

Propane being fed to the carburetor 26 under pressure, means are provided, following the invention, to shut off the fuel-line 27 if the engine 14 shall not work, and to open this fuel-line the moment the crank shaft of the engine is engaged by clutch 15 and is turning 1750 R. P. M. while motor 13 is operating as a starter. Such means are illustrated in the drawing by needle valve 32 in the fuel-line 27 and by the centrifugal valve 33 in the fuel/refrigerant line 23. The needle valve 32 is preferably arranged in the low pressure, six ounces, zone of the fuel-line 27 and is operated by a piston 33 which is subjected on the one side to the pressure of a spring 34 and on the other side to the pressure of air produced by the engine blower 35. The needle valve 32 is kept open only as long as the shaft of engine 14, to which the blower 35 is engaged, is turning. Otherwise spring 34 closes the valve. Equally, the high-pressure valve 33 is kept open under the centrifugal power of the governor 36 only as long as the shaft 37 of engine 14 is turning. Otherwise a spring 38 closes the valve.

After motor 13 has been used as starter for engine 14 and after the centrifugal levers 31 have interrupted the electric current, the plug 39 may be disconnected from the local current supply of the garage and the truck can be sent on its way. In this phase the engine 14 will drive the compressor 12 and the blower 11, while the shaft 16 and the rotor 40 of the electrical motor are idling with disengaged contacts 31.

Returning to the garage at night, the driver can disengage the engine 14 by clutch 15 and can connect the plug 39 with the electric current supply of the garage.

This operation of the clutch will not only shut off the fuel-line 27 by needle valve 32 and thereby stop the engine 14, but the same operation will also close the fuel/refrigerant line 23 by means of valve 33. This, in conjunction with closing line 27, will at the same time change the transitory cycle of the fuel/refrigerant into an ordinary closed refrigeration compression cycle as is standard in electrically driven systems. I may emphasize, that such a closed propane cycle is feasible as a sequence to a transitory cycle, if this transitory cycle has been applied for a certain length of time, sufficient to purge the condenser from non-condensible gas by bleeding gas off through fuel-line 27. Such purging conditions are sufficiently secured here, as the daytime refrigeration requirements with the propane engine drive are regularly interrupting the closed cycle operation of the night-shift electrical drive.

I wish to point out that the present invention may also be applied to the operation of a constantly closed cycle with any stable refrigerant, without feeding new refrigerant through a line 23 and without bleeding condenser gas through a line 27. In this case, the engine arrangement would stand as described and illustrated, with the only exception that a short cut from point a to point b would connect line 23 directly with the reduction valve 29. In this case, the take-off 41 of the receiver space 28 would be closed and the thermal-valve 24 with its bulb 42 could be eliminated.

However, the closed cycle would miss all the great advantages of the transitory cycle; leakage of refrigerant would put the refrigerating circuit out of operation, and foreign vapor pressures, accumulating in the condenser, would reduce its efficiency.

There are compressors on the market which operate at such high R. P. M. as 1750 or 2000 R. P. M., and which allow the direct coupling with the electrical motor 13 and the engine 14, as shown in the drawing. If compressors with smaller R. P. M. shall be used, a gear 43 can be provided. Such gears are standard equipment of such electrical motors as motor 13 and may be arranged within a gear box 44, which forms part of the motor-housing.

I have described the invention from the specific point of view of creating a mobile refrigeration system, and I have described the merits of the new arrangement as experienced from a practical development job. I am aware that this new method of operating a power installation, in which the power is supplied alternatingly by a combustion engine and an electrical motor, will improve such installations in general. It will be possible to drive appliances during the daytime with a combustion engine and during the night with an equally powerful, silent, electrical motor without necessitating expensive automatic starting equipment or without the handicap of a hand-cranking.

In the special case of a combination of a gas fuel motor and an electrical motor I have shown simple ways of controlling the valves of the gas fuel and the cut-out of the electric current. Altogether, I have made it possible to shift over from one driving means to the other by one single operation of the clutch, while completely eliminating the grave troubles normally connected with the starting of the combustion engine.

The shifting from one driving means to another may not only be desirable from the point of view of avoiding noise or supervision during the night, but may also be dictated by taking advantage of certain hours of low tariff for the electric current to run the electrical motor, while operating the combustion engine during the high tariff period. Air compressors, washing machines, water pumps, and other home appliances, as well as refrigerators in general, may benefit from this present invention.

In the case of operating a transitory refrigerating compression cycle in connection with a combustion engine, the present invention is of specific importance, as it provides at the same time a shifting from the transitory cycle to a closed cycle when shifting the driving means from combustion engine to electrical motor.

In view of the importance of saving weight in such a mobile installation I may mention the advantage of the direct coupling of engine 14, motor 13 and compressor 12 in line; the idling of the rotor 14 having a flywheel effect, which allows to renounce at the installation of a special flywheel for the compressor and to reduce the mass of the flywheel of the engine 14.

Having now described the nature of my invention and indicated by way of example the manner in which it may be performed, what I claim is:

1. The method of producing refrigeration by means of a system, which is arranged to be powered by a combustion engine and by an electrical motor, said method comprising alternately operating said engine to cause refrigerant to circulate through said system in a transitory cycle, in which refrigerant is withdrawn from said system and consumed as fuel, while make-up refrigerant is added to said system from an outside source; and operating said electrical motor to cause a trapped charge of refrigerant to circulate through said system in a closed cycle to produce cooling.

2. The method as claimed in claim 1, comprising the step of employing said electrical motor as a starter motor for starting said combustion engine while shifting from the closed cycle refrigeration to said transitory cycle refrigeration.

3. The method as claimed in claim 1, comprising the step of controlling by the movement of said combustion engine the flow of fuel withdrawn from said refrigerating system and the flow of make-up refrigerant added to said refrigerating system.

4. The method as claimed in claim 1, comprising the step of cutting off the supply of current to said electrical motor in response to the operation of said combustion engine.

PETER SCHLUMBOHM.